United States Patent Office 2,835,689
Patented May 20, 1958

2,835,689

PRODUCTION OF ALUMINUM TRIALKYLS AND ALUMINUM ALKYL HYDRIDES

Karl Ziegler and Hans-Georg Gellert, Mulheim an der Ruhr, Germany; said Gellert assignor to said Ziegler No Drawing. Application July 27, 1955
Serial No. 524,797

Claims priority, application Germany August 4, 1954

13 Claims. (Cl. 260—448)

This invention relates to new and useful improvements in the preparation of aluminum trialkyls and aluminum alkyl hydrides.

Aluminum trialkyls and aluminum alkyl hydrides constitute highly active catalysts or catalyst components as, for example, in the dimerization of olefines or the polymerization of ethylene and/or olefines.

These aluminum compounds may further be used as valuable intermediates for the preparation of many other compounds as, for example, alcohols with the use of oxygen, halides with the use of halogens, sulfinic acids and sulfonic acids and mercaptanes with the use of sulfur dioxide, organic cadmium compounds with cadmium dichloride, organic mercury compounds with mercury dichloride, organic silicone compounds with silicone tetrafluoride and organic boron compounds with boron trifluoride.

In co-pending application, Serial No. 484,576, filed January 27, 1955, a process is described for the production of these valuable organic aluminum compounds.

In accordance with the said patent application, aluminum hydrocarbons of the formula $Al(C_nH_{2n+1})_3$ and $HAl(C_nH_{2n+1})_2$ in which $n$ is a whole number greater than 1, may be prepared by reacting aluminum which presents a surface which is substantially free from protective oxide film or aluminum which has been activated with a suitable catalyst with olefines such as olefines having a terminal double bond and hydrogen.

The reaction proceeds in accordance with the following equations:

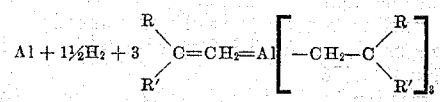

and

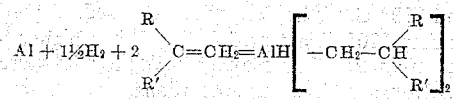

in which R and R' are hydrogen or hydrocarbon radicals.

It is preferable if in the starting olefine both R and R' are hydrocarbon radicals since in case either one or both of R and R' are hydrogen, i. e., when using α-olefines or ethylene, the reaction is impaired by side reactions which occur at a temperature in excess of about 100° C. These undesirable side reactions are the conversion of the ethylene or alpha-olefines at a temperature in excess of about 100° C. in the presence of the aluminum compounds formed during the reaction as described, for example, in German Patent No. 878,560 of February 17, 1953, and in Zeitschrift Angewandte Chemie, vol. 64, pages 323–329 (1952).

The formation of the aluminum hydrocarbons in accordance with the said application, by the reaction of aluminum hydrogen and olefine, however only proceeds rapidly at temperatures above about 100° C. When using α-olefines or ethylene in order to avoid the above-mentioned disturbing side eraction, it is necessary to operate at the lowest possible temperatures as a result of which the reaction proceeds extremely slowly.

One object of this invention is a novel process for the production of aluminum hydrocarbons which will avoid the above-mentioned difficulties even when using ethylene and α-olefines. This and still further objects will become apparent from the following description:

The invention resides in a combination of specific reaction steps.

In accordance with the first reaction step, an aluminum compound having the formula

or

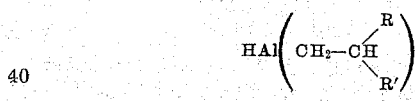

in which R and R' are hydrocarbon radicals or together with C may be in the form of a ring, are formed by reacting aluminum and hydrogen with an olefine having the formula:

where R and R' are as described above, in the manner set forth in our said co-pending application, Serial No. 484,576.

The organic aluminum compound thus formed and having the above formula is then reacted in a second reaction step with any olefine having a terminal double bond which differs from the starting olefine of Step 1 including ethylene and α-olefines and further including cyclo-olefines having 4, 5, 7 and 8 carbon atoms and at least C=CH— group in the ring and fulvenes.

The reaction in the second step may be termed a displacement reaction and in the case of triisobutyl aluminum and ethylene proceeds in accordance with the following equation:

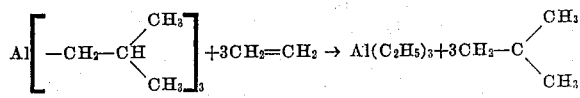

It has been found that this "displacement" reaction proceeds readily under mild temperature conditions of 50 to 150° and preferably 70 to 120° C. Under these mild temperature conditions the undesirable side reactions resulting in the conversion of ethylene or α-olefines will not occur.

The displacement reaction proceeds in the same manner using in place of aluminum trialkyl, the corresponding dialkyl aluminum hydride produced in the manner described in our said co-pending application, Serial No. 484,576. The terms, aluminum trialkyl and dialkyl aluminum hydride as used herein, are specifically intended to include the ring compounds in which C, R and R' as set forth in the above formula, are joined in the form of a ring.

When using the dialkyl aluminum hydrides in the second reaction step and when using only 2 mols of olefine in the displacement reaction in this reaction step, the corresponding doubly organic substituted aluminum hydrides are produced. In the case of diisobutyl aluminum hydride and ethylene or its higher homologs, this reaction is represented by the following equation:

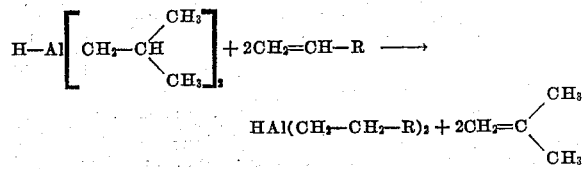

Similar final products will be produced even when starting with aluminum trialkyls in displacement reaction of the second reaction step when only using 2 mols of the olefin as is shown in the following equation:

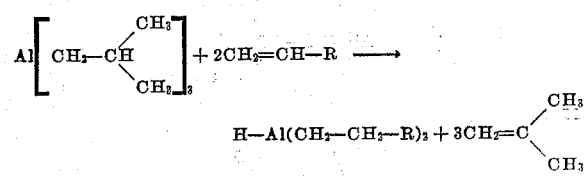

As may be seen, the olefin used in the first reaction step is recovered in the second reaction step and may be recycled and repeatedly re-used in the first reaction step.

Though it is possible to use as the olefin in the first reaction step, any olefin having a terminal double bond connected to a tertiary carbon atom as, for example,

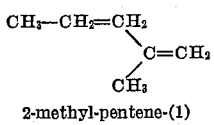
2-methyl-pentene-(1)

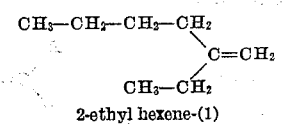
2-ethyl hexene-(1)

as well, however, as limonene

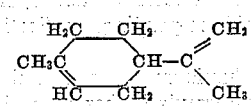

it is preferable to use isobutylene since the reaction of the first step is preferably effected in a relatively high pressure as, for example, a hydrogen pressure up to about 200 atmospheres or more. Due to this pressure, expensive pressure resistant reactors must be employed which, for economic considerations, should be utilized to their maximum. The utilization of the pressure reactor is determined by the maximum amount of aluminum which dissolves in the capacity of a given vessel during the first reaction step in the olefin-hydrogen mixture to form the aluminum organic compound. Isobutylene, of all the olefins which enter into consideration, is the one having the lowest molecular weight and therefore leads to the best utilization with respect to volume. Furthermore, the isobutylene is the cheapest and most readily available of all the olefins of similar molecular structure. Even though the olefin is recovered from the second step, the cost factor is of importance since as a rule a portion of the olefin, as, for example, about 10% to 20%, is hydrogenated in the first step and thus cannot be recovered in the second step. Additionally, the isobutane formed by the hydrogenation in the first step, can easily be thermally decomposed to again form the isobutylene and hydrogen in a particularly easy manner, while a similar decomposition of hydrogenated higher homologs of isobutylene cannot be so readily effected.

Due to the above considerations, it is not only advisable to use the two-step reaction in accordance with the invention for the conversion of aluminum to organic aluminum compounds when using ethylene and α-olefins as the olefins, but it is also advisable when effecting the conversion using any olefins having a terminal double bond connected to a tertiary carbon atom as, for example, homologs of isobutylene. In this connection, the second step displacement reaction leads to an equilibrium which may be represented in accordance with the following equation:

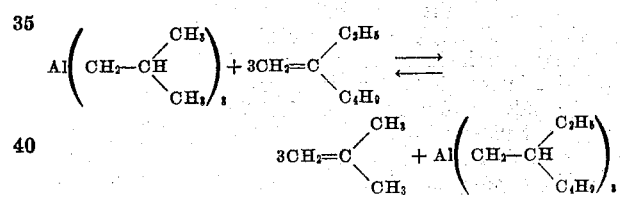

Upon heating, however, preferably under reduced pressure, the most volatile component, as, for example, in the case of the above equation, the isobutylene, will be driven off so that the aluminum compound of the higher molecular weight component as, for example, in the above equation, the triisooctyl aluminum will finally be formed.

Since the greatest loss of olefin occurs during the reaction of the aluminum olefine and hydrogen, by using the two step process in accordance with the invention and using the lower boiling point olefine, which is usually the less expensive, in the first step, and the more expensive higher boiling olefine in the displacement reaction in the second step, a higher conversion and better utilization of the more expensive olefine is effected in the overall process.

In the second step, it has been found preferable to use metals having a large surface as, for example, nickel, cobalt or platinum, as catalysts.

The reaction conditions in the first reaction step are the same as are set forth in our co-pending application, Serial No. 484,576.

The reaction in the second step is merely effected by heating preferably in the presence of the catalysts mentioned above. The reaction commences at about 70° C. and becomes vigorous between the temperatures of about 120 and 130° C. When α-olefines are used, temperatures of less than 120° C. are preferable. When higher boiling olefines are used, they may be used in admixture with inert solvents such as hydrocarbons, as, for example, hexane or aromatic hydrocarbons such as benzene. The solvent in this connection is preferably so selected with respect to its boiling point and amount, that a mixture is formed which has a boiling point at about the desired reaction temperature. The solvent in this case acts as a carrier for the olefine from the first step.

The following examples are given by way of illustration and not limitation:

Example 1

Triisobutyl aluminum is prepared in accordance with patent application Serial No. 484,576, by introducing a thin paste of activated aluminum in aluminum trialkyl into the top of a vertical pressure resistant reaction tower while, at the same time, recycled isobutylene and hydrogen under pressure are introduced from the bottom, and eddy the aluminum and effect the mixing of the contents of the tower. 97 grams of the triisobutyl aluminum prepared in this manner are heated under a nitrogen atmosphere with 340 grams of 2-ethyl-hexene-(1) (boiling point 120° C.) to the boiling point under reflux. The isobutene which develops in this connection is collected in a receiver which is cooled to a low temperature. The generation of gas terminates after 3 hours. There are obtained 76 grams of isobutene (theoretical amount: 82 grams). Thereupon, the excess olefine is distilled at a bath temperature of not more than 90° C., first of all under a mild vacuum, and then under the full vacuum produced by a water-jet pump. The residue (171 grams) consists of practically pure triisooctyl aluminum. (Found: 7.6% Al. Calculated: 7.4% Al.)

Example 2

Triisohexyl aluminum is prepared in accordance with Example 4 of patent application Serial No. 484,576 from aluminum shot, 2-methyl-pentene-(1) and hydrogen in the presence of aluminum diethylchloride at 110 to 120° C., the pressure dropping from an initial value of 300 atmospheres' gauge to 80 atmospheres' gauge. 140 grams of the purified triisohexyl aluminum are heated with 120 grams of propylene for 4 hours at 110° C. in a 500 cc. autoclave which has been rinsed with nitrogen. The pressure in this connection drops from an initial value of 49 atmospheres gauge to 25 atmospheres' gauge. The autoclave is then allowed to cool to 80° C., whereupon the excess propylene is blown off, and the 2-methyl-pentene-(1) produced at this temperature is distilled away, whereupon the last traces of the olefin are drawn off in vacuum. In order to complete the displacement of the isohexene, about 100 grams of propylene are again introduced into the autoclave and it is heated again for 4 hours at 110° C., in which connection the pressure for all practical purposes does not change. After the excess propylene has been blown off, the contents of the autoclave are distilled. At 65° C., under a pressure of 0.1 mm. Hg, the tripropyl aluminum passes over in a practically quantitative yield. (Found: 17.2%. Calculated: 17.3% Al.)

Example 3

To 22.5 grams triisobutyl aluminum, prepared in the manner described in Example 1, 39 grams freshly distilled styrene and 70 cc. dry hexane, there were added in a nitrogen atmosphere 0.3 cc. of an 0.2 molar suspension of nickel acetylacetone in hexane, the mixture being then slowly heated on an oil bath. The isobutene generated in this connection is collected in the gasometer via a reflux condenser. The development of the gas commences at a temperature of the bath of 50° C. and is complete within an hour if the hexane is allowed to boil. There are obtained 7.4 liters of pure isobutene (calculated: 7.6 liters). The excess styrene is removed under vacuum at a bath temperature of up to 90° C. and the last traces under a high vacuum. The residue is tri-(phenyl-ethyl) aluminum. (Found: 8.2% Al. Calculated: 7.9% Al.) Yield: 98 grams.

Example 4

400 grams triisobutyl aluminum, prepared as described in Example 1, are heated with the exclusion of air, in a 2 liter autoclave provided with a pressure reflux condenser with 900 cc. of hexene-(1) at 110 to 120° C. The pressure increases as a result of the release of isobutene. The isobutene is allowed to escape via the pressure reflux condenser approximately as it forms, but it is seen to it, by a suitable regulation of the pressure reduction valve, that as little hexene as possible goes off with it.

After the cessation of the generation of the isobutene, the autoclave is allowed to cool, and its contents are distilled under the highest possible vacuum (<0.01 mm.). The trihexyl aluminum then passes over quantitatively at a temperature of the bath of up to 150° C. (Found: 9.7% Al. Calculated: 9.6% Al.)

Example 5

107 grams triisobutyl aluminum prepared as described in Example 1, are boiled under reflux for 9 hours with 182 grams dodecene-(1), (molar ratio 1:2) at a temperature of the bath of 130° C. and at 20 mm. pressure. The isobutene which develops is collected in a receiver which is cooled to a low temperature. 89 grams are obtained (theoretical quantity: 91 grams).

The residue is heated in a high vacuum (<0.01 mm.) for a further period of about 2 hours at 120° C. and is then allowed to cool. It solidifies after some time, and has a flash point of 30 to 35° C. There is obtained essentially didodecyl-aluminum hydride ($[C_{12}H_{25}]_2AlH$). This can be noted from the aluminum content (found, 7.0% Al; calculated, 7.4% Al) and from the fact that upon decomposition with water, the correct quantity of hydrogen and dodecane is obtained. Yield: 195 grams.

Example 6

A vertical externally heated pressure tube of a capacity of 5 liters and a length of 2 meters contains packing material consisting of rolled (steel) netting wire. Triisobutyl aluminum which contains 0.1% by weight colloidal metallic nickel (added as nickel acetylactone) is continuously forced by means of an injection pump into the top of the tube which is heated to a temperature of 50° C. and at the same time, an ethylene pressure of 60 atmospheres' gauge is maintained in the tube.

At the lower end of the tube, its contents of triethyl aluminum plus isobutene plus some ethylene are discharged with pressure reduction into a receiver cooled to a temperature of —10° C. Upon heating, first of all some ethylene and then isobutylene escape from the reaction product. The remaining residue upon distillation under vacuum (nitrogen atmosphere) gives pure aluminum triethyl.

The arrangement described easily gives about 2 liters pure triethyl aluminum per hour.

Example 7

To 672 grams n-hexadecene-(1) and 200 grams triisobutyl aluminum, prepared as in the previous examples, there are added, in a flask provided with a reflux condenser, under nitrogen, sufficient dry, air-free benzene that the boiling point measured in the mixture is 110° C. The mixture is boiled under reflux, in which connection isobutene escapes from the top of the condenser and can be collected. By the occasional addition of further benzene, the boiling point is maintained at 110° C. After boiling for several hours, there escape a total of 168 grams of isobutene. After the generation of the isobutylene has stopped, the benzene is distilled off in a mild vacuum and 700 grams trihexadecyl aluminum remain in the form of a thick oil having the correct aluminum content (about 4%).

In the same way the following reactions were carried out:

| | | Al-Content, percent |
|---|---|---|
| Vinylcyclohexene | into ... | 7.6 |
| Limonene | into ... | 6.2 |
| Camphene | into ... | 6.2 |
| Dimeric alpha-dodecene | into ... | 2.6 | from alpha-dodecene in accordance with German Patent 878,560.

*Example 8*

20 grams triisobutyl aluminum, prepared as described in the foregoing examples, were boiled in a nitrogen atmosphere with 50 grams cyclooctene under reflux. In the course of several hours, 17 grams of isobutylene escaped. After the termination of the isobutylene generation, the excess cyclooctene was distilled off in vacuum at 100° C. There were obtained 25 liters of oil as residue which consisted essentially of dicyclooctyl aluminum hydride.

*Example 9*

198 grams triisobutyl aluminum and 450 grams vinylcyclohexene (obtained by thermal dimerization of butadiene) are mixed under nitrogen in a vessel provided with a reflux condenser and sufficient benzene is added so that the boiling point of the liquid, measured in the liquid, is 110° C. This mixture is vigorously boiled, isobutylene escaping in a brisk stream from the upper end of the reflux condenser. The quantity of isobutylene split off is observed in a suitable manner, for instance, by low temperature cooling and weighing, or by collecting in a gasometer, or by means of a gas meter connected behind the condenser. After a number of hours (generally a maximum of 10 hours is sufficient) the splitting off of the isobutylene ceases, and by this time 150 to 160 grams isobutylene have passed over. Heating is continued under vacuum using a descending cooler, benzene first distilling over, followed by 120 to 125 grams vinylcyclohexene, which is used in excess in order to accelerate the reaction. As residue, there is obtained the aluminum compound in a quantity of 350 grams.

We claim:
1. In a process for the production of aluminum hydrocarbons the improvement which comprises contacting an aluminum hydrocarbon selected from the group consisting of compounds having the formula

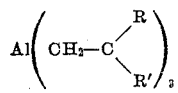

and

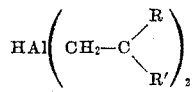

in which R and R' are aliphatic hydrocarbon radicals and further members thereof in which

form a hydrocarbon ring with an olefin differing from the olefin corresponding to the organic radical of said compound and selected from the group consisting of olefins having a terminal double bond and cyclo olefins having 4, 5, 7, and 8 carbon atoms and at least one C=CH group in the ring, at a temperature between about 50° and 150° C., and recovering the aluminum hydrocarbon formed.

2. Process according to claim 1 in which the organic radical of said first-mentioned group member is the isobutyl radical.

3. Process according to claim 1 in which said contacting is effected in the presence of a metal catalyst comprising a metal having a large surface and selected from the group consisting of nickel, cobalt, and platinum.

4. Process according to claim 1 in which said contacting olefin is ethylene.

5. Process according to claim 1 in which said contacting olefin is an α-olefin and in which said contacting is effected at a temperature below about 120° C.

6. Process according to claim 1 in which said contacting is effected at a temperature between about 70° and 120° C.

7. Process according to claim 1 in which said contacting is effected in the presence of an inert solvent.

8. Process according to claim 7 in which said solvent is a hydrocarbon.

9. Process according to claim 8 in which said solvent is benzene.

10. Process according to claim 8 in which said solvent is heptane.

11. Process according to claim 1 in which said contacting is effected in the presence of an inert solvent capable of acting as an azeotropic carrying agent for the contacting olefin and forming a mixture boiling at about said contacting temperature.

12. Process according to claim 1 in which said contacting olefin and aluminum hydrocarbon are present in a molar ratio of at least 3:1.

13. Process according to claim 1 in which said contacting olefin and aluminum hydrocarbon are present in a molar ratio of about 2:1 and in which said recovered aluminum hydrocarbon is an aluminum dialkyl monohydride.

No references cited.

UNITED STATES PATENT OFFICE
Certificate of Correction

Patent No. 2,835,689

May 20, 1958

Karl Ziegler et al.

It is hereby certified that error appears in the above numbered patent requiring correction and that the said Letters Patent should read as corrected below.

Column 2, line 15, after "aluminum" insert a comma; line 18, for "eraction" read —reaction—; column 4, line 60, for "nickel." read —nickel,—; column 5, line 55, after "17.2%" insert —Al;—; column 8, lines 44 to 47, the formula should appear as shown below instead of as in the patent:

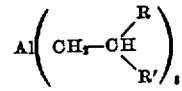

lines 49 to 52, the formula should appear as shown below instead of as in the patent:

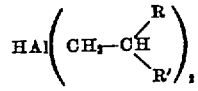

lines 56 to 59, the formula should appear as shown below instead of as in the patent:

Signed and sealed this 15th day of August 1961.

[SEAL]

Attest:
ERNEST W. SWIDER,
*Attesting Officer.*

DAVID L. LADD,
*Commissioner of Patents.*